May 27, 1947.   R. P. McCULLOCH ET AL   2,421,346
VALVE
Filed Dec. 24, 1943   2 Sheets-Sheet 1
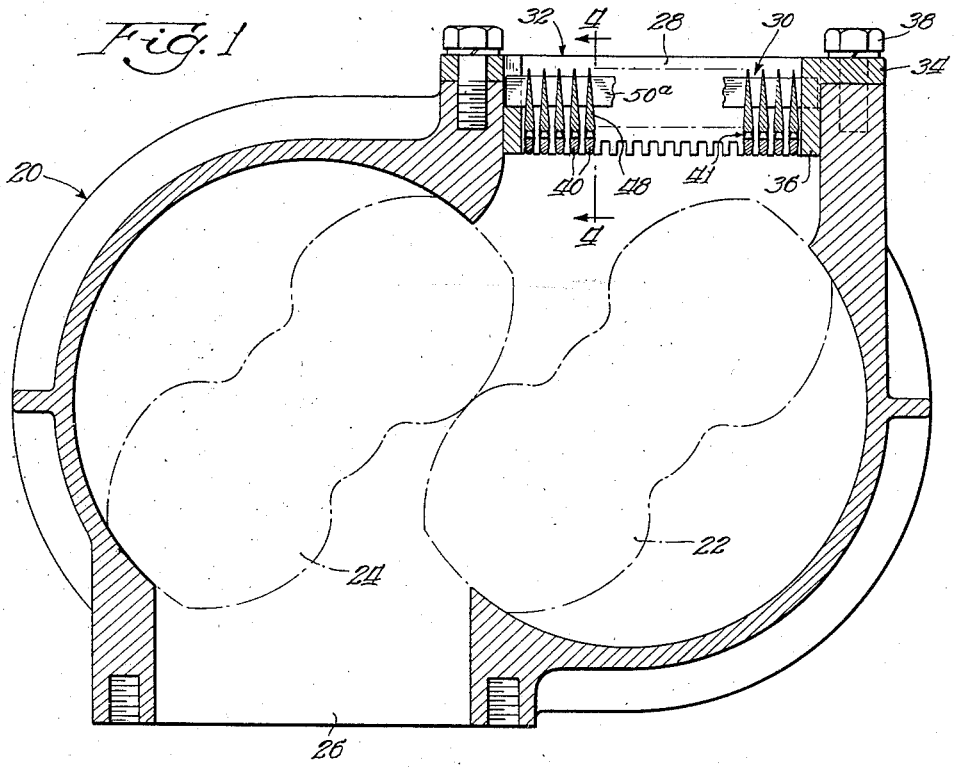
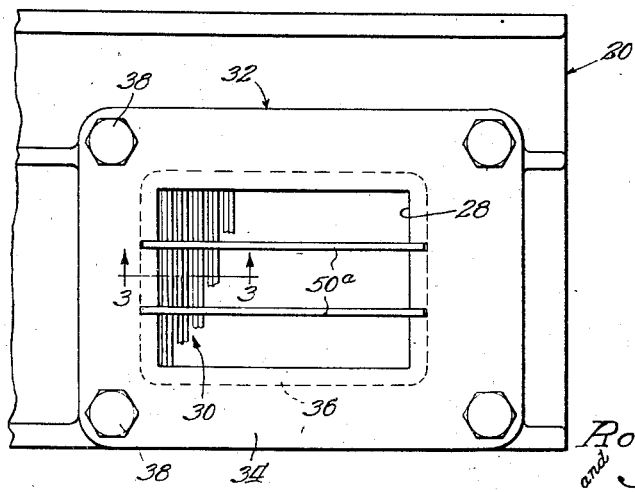
Inventors:
Robert P. McCulloch
and John L. Ryde.
By Edward C. Fitzhaugh
Atty.

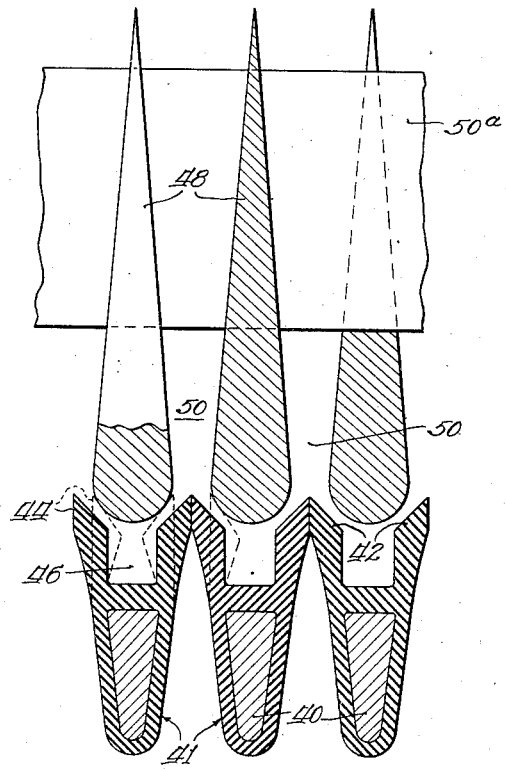
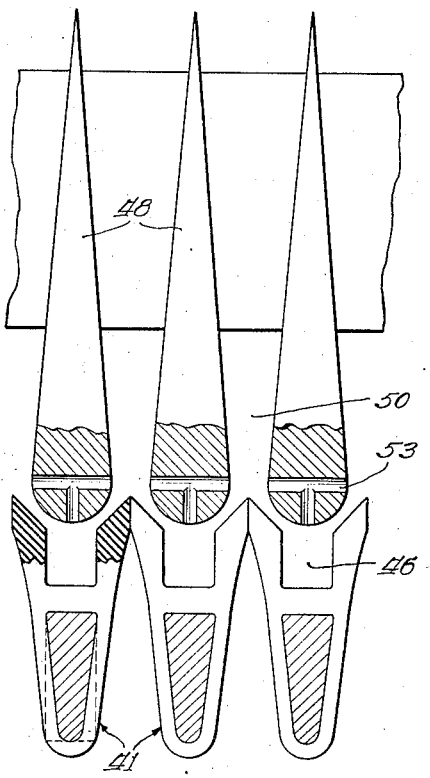
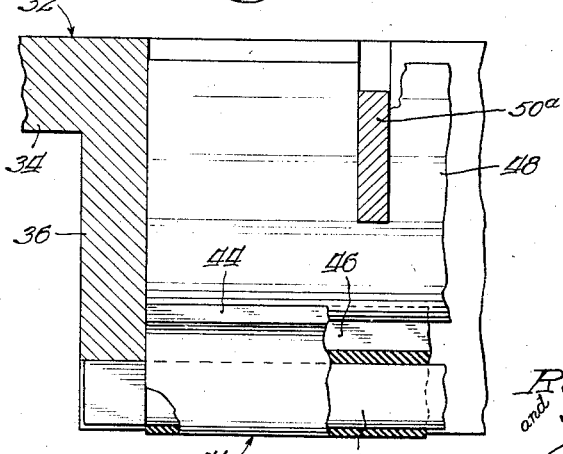

Patented May 27, 1947

2,421,346

UNITED STATES PATENT OFFICE 2,421,346

VALVE

Robert P. McCulloch, Fox Point, and John L. Ryde, Milwaukee, Wis., assignors, by mesne assignments, to Borg-Warner Corporation, Chicago, Ill., a corporation of Illinois Application December 24, 1943, Serial No. 515,575

1 Claim. (Cl. 251—119)

This invention is directed to a valve assembly. The invention especially has to do with a valve particularly suitable for superchargers, compressors, pumps and the like.

It is an object of the present invention to disclose an improved flexible valve intended primarily for use in the outlet of a supercharger.

The principal object is to provide a valve which will reduce the power requirements for operation of a supercharger by eliminating the discharge back pressure through a portion of the operating cycle.

In this connection, efforts have been made in the past to use a valve for regulating the flow of a gas, such as air, under pressure whereby substantially a one-way flow is secured. In the case of the Roots type superchargers, operating at relatively high speeds, the use of a flexible elongated flap type valve has been beset with troubles due to the rapidity of operation, much of the trouble having been occasioned by the inertia of the material forming the valve as well as the effect of air pockets adjacent the flexible elements retarding the necessary rapid flexing thereof. While Thompson in U. S. Patent No. 247,857 has contributed materially to the solution of the problem, no one has to applicants' knowledge, succeeded in providing a suitable valve having flexible, such as rubber or Neoprene, grid-type elements wherein the inertia and back pressures are substantially reduced or entirely removed as factors seriously retarding the operation of the valve.

It is an object of the present invention to provide an improved form of valve in which the above-mentioned objections are overcome. It is a further object to provide a construction in which there is created in the vicinity of each valve flexing element, a substantially reduced pressure area whereby the inertia of said flexing element is practically eliminated.

It is another object of the invention to provide an assembly in which use is made of what may be termed reed-like, flexible, reinforced valve elements in combination with a vane assembly, whereby there is created what may be termed a Venturi action, removing pressure from behind the flexible reed-like valve elements (herein termed "wings").

It is a further object to provide a construction which is relatively inexpensive to manufacture, is easily assembled, is highly efficient for both the flow of air (or other pumped medium) in one direction and the blocking of flow in the other direction. It is an object to disclose a device which is relatively rugged, can be repaired without much difficulty, and which is simple.

The invention consists of the novel constructions, arrangements and devices to be hereinafter described and claimed for carrying out the above-stated objects, and such other objects as will appear from the following description of a certain preferred embodiment illustrated in the accompanying drawings wherein:

Fig. 1 is a sectional, elevational view of a Roots type supercharger having mounted therein a valve constructed in accordance with the disclosures of this invention;

Fig. 2 is a fragmentary plan view indicating particularly the valve arrangement of Fig. 1;

Fig. 3 is an enlarged sectional view taken on the lines 3—3 of Fig. 2, looking in the direction of the arrows;

Fig. 4 is a view taken on the lines 4—4 of Fig. 1 looking in the direction of the arrows; and Fig. 5 is a cross-sectional view showing a modified form of the invention.

Like characters of reference designate like parts in the several views of the drawings.

Referring more in detail to the constructions shown in the various figures, and referring first to Fig. 1, there is disclosed a supercharger 20, having rotors 22 and 24, and an inlet port 26 and discharge port 28. It is understood of course that while the disclosure herein is to a supercharger of the Roots type, almost any fluid-moving pump or compressor, and particularly a gas or air pump, in which there is need for a valve of this type, would be applicable. However the present valve is particularly adapted to the general use indicated wherein the rotors move at relatively high speeds in ordinary use (between 2800 to 5000 revolutions per minute in the form shown), and there are correspondingly high frequencies of opening and closing of the valve.

Seated in the outlet or discharge port 28 of said supercharger, is located the valve assembly 30 forming the principal subject matter of the present invention. As disclosed, this valve assembly 30 comprises a valve case 32 having the horizontal flange portion 34 and the downwardly depending wall portion 36, the two together forming a box-like member with open top and bottom adapted to fit and be removably retained in said supercharger discharge port as indicated in Fig. 1. Said valve assembly may be retained in position by any convenient means, such as by the machine screws 38.

The wall 36 along the sides on each side may be provided with a plurality of slots into which are inserted the ends of the bars 40 of the valve member 41 to form a grid-like assembly. These bars 40 may be held in position in such slots by any convenient means, such as by crimping, spot welding, or otherwise. For quantity production the grid may be formed as a unit by stamping or die casting, for example. Intermediate their ends and from inside wall to inside wall of the case, the bars 40 are provided with one or more wings or flaps preferably of rubber, Neoprene, or similar flexible material which flaps are herein termed wings 42. These wings 42 are preferably shaped as indicated in Fig. 3, and have the normal position where the outside lands or edges 44 of each valve member 42 seats against the corresponding outside land of the adjacent valve member on each side to close the space between the valve members against the return of air to the interior of the supercharger. It is understood that a hinged flap of relatively non-flexible material may be used if desired, although so far as has been determined to the present time, a flexible Neoprene or rubber flap is preferable.

When the wings 42 are in the dotted line position shown in Fig. 3, the air pressure from the interior of the supercharger is passing through the air passage 50 between the wings, and the valve is opened. When the valve members 42 have their outside lands or edges 44 together, the valve is closed.

Upon the pressure in the supercharger reaching an amount great enough to force the wings apart, a Venturi action is immediately set up which hastens the opening of the valve, reduces the pressure necessary to continue the valve opening operation, and thereby reduces the back pressure on the supercharger, thus cutting down the power requirements necessary for the operation thereof.

It is understood that the Venturi action which is set up immediately when the wings begin to separate, the air pressure in the space 46 is drawn out and the resistance to the wing opening is substantially eliminated. Upon a drop in pressure in the supercharger, the wings drop back into place. This cycle is repeated several thousand times per minute in ordinary operation.

As shown in Fig. 5, the members 48 are provided with one or more air ports 53 leading from the air passage 50 into the space 46. These air ports prevent a vacuum lock between the wings when the latter are in open or raised position, and likewise assist in the flow of air into and from said space 46 on the closing and opening of the wings.

The vanes 48 are provided in a grid-like vane assembly comprising a plurality of said vanes spaced from and aligned with said valve members 41, and serve several purposes among which are to complete the Venturi passages through the valve, to act as a stop for the wings 42 whereby excessive movement, that might tend to cause collapse or substantial deterioration, is prevented. These vanes 48 individually are of somewhat streamlined or tear drop shape in cross-section, and the vane assembly is positioned so that a vane is located above each of the valve elements 40 and is centered thereover and spaced therefrom a distance sufficient to allow the wings 42 to open the desired amount before contacting the vane 48. This contact is clearly illustrated by the dotted line positions of said vanes as shown in Fig. 3.

The area between the adjacent vanes and between the valve elements when the wings 42 are open to allow the passage of air, retains a Venturi-like action. The Venturi action of said passage in turn results in substantial evacuation of the air from space 46 when the air being pumped by the supercharger is exhausted through the passage 50 between the adjacent valve elements and vanes.

For the purposes of ease in manufacture and to eliminate excess expense, the end walls of the case may be slotted as is clearly apparent from Fig. 2, for example, and the vanes are assembled on a pair of cross bars 50a which extend into the slots of said case and may be held therein by any convenient means such for example as by spot welding, press fitting or otherwise attaching. This permits the assembly of the vanes to the desired position in one operation after the vanes have been mounted on said cross bars. These vanes may be die cast as an assembly with the cross bars 50 or molded from plastics.

In operation, each time the rotors 22 and 24 pass the edge of the discharge port, there will be a sudden drop in pressure in the valve due to the back flow of air into the side pockets or buckets of the supercharger. This will cause the wings 42 to close together as above pointed out. As soon as the next rotor plate moves up to a position where the pressure in the supercharger is sufficient to start the wings 42 flexing, the air pressure behind the wings will be drawn out by the Venturi action and the wings will flex without substantial back pressure to a position where they approach or touch the vanes 48. This is true in all forms shown. As soon as these rotor plates pass the edge of the discharge port, back pressure immediately closes the wings again, thus closing the air passage 50. The cycle is repeated several times during each revolution of the supercharger. The air port 53 increases the certainty of operation and the ease of operation.

It is understood that there is some latitude in the formation of the wings, and the applicants have tried out several forms with successful results. However, the most desirable arrangement so far found by the applicants is that disclosed herein. The bars 40 likewise may be square, triangular, or other shape, but preferably are of the shape shown here which contributes materially to the forming of the adjoining passage 50 between the valve elements into a venturi.

While this invention has been described in detail in its present preferred form or embodiment, it will be apparent to those skilled in the art, after understanding the invention, that various changes and modifications may be made therein without departing from the spirit or scope thereof. It is aimed in the appended claim to cover all such changes and modifications.

We claim:

A valve for a fluid displacement device comprising walls defining an open frame; a first grid and a second grid arranged in superposed spaced relation in said frame; said first grid comprising a plurality of vanes each having a cross-section of tear drop formation tapered in the direction of the normal flow of pressure fluid; said second grid comprising a plurality of bars aligned with said vanes; and a pair of spaced wings on each bar, said wings being inherently flexible and having spear shape end regions tapered in the direction of normal flow of fluid; each pair of said wings being so constructed and arranged that outward flow of pressure fluid is effective to bend each wing in a direction to engage a side face of its spear shape region with the adjacent side of the large end of an adjacent vane, and upon cessation of the flow of pressure fluid said each wing bends toward and engages its spear shape end region with the spear shape end region of a wing of the adjacent pair of wings thereby to prevent back flow of the pressure fluid past said wings.

ROBERT P. McCULLOCH.
JOHN L. RYDE.

REFERENCES CITED

The following references are of record in the file of this patent:

FOREIGN PATENTS

| Number | Country | Date |
| --- | --- | --- |
| 18,304 | Great Britain | Aug. 2, 1910 |
| 56,903 | Denmark | Nov. 6, 1939 |
| 92,936 | Germany | Aug. 6, 1897 |
| 526,671 | Great Britain | Sept. 24, 1940 |
| 66,830 | Sweden | Feb. 19, 1929 |